US012716114B2

(12) United States Patent
Mitsunobu et al.

(10) Patent No.: US 12,716,114 B2
(45) **Date of Patent: *Aug. 25, 2026**

(54) HOT-DIP PLATED STEEL MATERIAL

(71) Applicant: NIPPON STEEL CORPORATION, Tokyo (JP)

(72) Inventors: Takuya Mitsunobu, Tokyo (JP); Kohei Tokuda, Tokyo (JP); Hiroshi Takebayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/285,460

(22) PCT Filed: Mar. 23, 2023

(86) PCT No.: PCT/JP2023/011387
§ 371 (c)(1),
(2) Date: Oct. 3, 2023

(87) PCT Pub. No.: WO2023/182398
PCT Pub. Date: Sep. 28, 2023

(65) Prior Publication Data

US 2024/0084422 A1 Mar. 14, 2024

(30) Foreign Application Priority Data

Mar. 23, 2022 (JP) ................................ 2022-046793

(51) Int. Cl.
*C22C 18/04* (2006.01)
*B32B 15/01* (2006.01)
*C23C 2/06* (2006.01)

(52) U.S. Cl.
CPC ............ *C22C 18/04* (2013.01); *B32B 15/013* (2013.01); *C23C 2/06* (2013.01)

(58) Field of Classification Search
CPC .......... C22C 18/04; B32B 15/013; C23C 2/06
(Continued)

(56) References Cited

U.S. PATENT DOCUMENTS 6,235,410 B1 5/2001 Komatsu et al.
6,465,114 B1 10/2002 Honda et al.
(Continued)

FOREIGN PATENT DOCUMENTS

AU 2010267413 B2 5/2015
CN 104903493 A 9/2015
(Continued)

OTHER PUBLICATIONS

Written Opinion of the International Searching Authority for PCT/JP2023/011387 (PCT/ISA/237) mailed on May 23, 2023.
(Continued)

*Primary Examiner* — Jie Yang
(74) *Attorney, Agent, or Firm* — Birch, Stewart, Kolasch & Birch, LLP

(57) ABSTRACT

The hot-dip plated steel material includes a steel material and a hot-dip plated layer disposed on a surface of the steel material, the hot-dip plated layer has a certain chemical composition, and the hot-dip plated layer has a diffraction intensity obtained from a result of X-ray diffraction measurement, the diffraction intensity satisfying a certain relationship.

3 Claims, 1 Drawing Sheet

(58) Field of Classification Search
USPC ........................................................ 428/659
See application file for complete search history.

(56) References Cited

U.S. PATENT DOCUMENTS

| | | | | |
|---|---|---|---|---|
| 8,562,757 | B2 * | 10/2013 | Tokuda | C23C 2/285 148/320 |
| 11,555,235 | B2 * | 1/2023 | Tokuda | C23C 2/02 |
| 11,781,200 | B2 * | 10/2023 | Tokuda | C23C 2/06 148/533 |
| 12,110,595 | B2 * | 10/2024 | Mitsunobu | B32B 15/013 |
| 2015/0352812 | A1 | 12/2015 | Jung et al. | |
| 2018/0087850 | A1 | 3/2018 | Ueno et al. | |
| 2018/0371598 | A1 | 12/2018 | Kim | |
| 2019/0390303 | A1 | 12/2019 | Tokuda et al. | |
| 2020/0002798 | A1 | 1/2020 | Tokuda et al. | |
| 2021/0010106 | A1 | 1/2021 | Kim et al. | |
| 2022/0112589 | A1 | 4/2022 | Mitsunobu et al. | |
| 2022/0119921 | A1 | 4/2022 | Mitsunobu et al. | |
| 2022/0145425 | A1 | 5/2022 | Mitsunobu et al. | |
| 2022/0152983 | A1 | 5/2022 | Mitsunobu et al. | |
| 2022/0341017 | A1 | 10/2022 | Kim et al. | |
| 2024/0093340 | A1 * | 3/2024 | Mitsunobu | B32B 15/013 |
| 2024/0425962 | A1 * | 12/2024 | Mitsunobu | C23C 2/50 |

FOREIGN PATENT DOCUMENTS

| | | | |
|---|---|---|---|
| CN | 108779542 | A | 11/2018 |
| CN | 110268087 | A | 9/2019 |
| EP | 4 079 923 | A1 | 10/2022 |
| JP | 10-306357 | A | 11/1998 |
| JP | 2002-322527 | A | 11/2002 |
| JP | 2004-339530 | A | 12/2004 |
| JP | 2005-320620 | A | 11/2005 |
| JP | 2017-66523 | A | 4/2017 |
| JP | 6365807 | B1 | 8/2018 |
| JP | 2021-4403 | A | 1/2021 |
| JP | 2021-508779 | A | 3/2021 |
| JP | 2021-85086 | A | 6/2021 |
| JP | 2021-85089 | A | 6/2021 |
| JP | 2021-195600 | A | 12/2021 |
| KR | 10-2017-0138827 | A | 12/2017 |
| WO | WO 00/71773 | A1 | 11/2000 |
| WO | WO 2011/001662 | A1 | 1/2011 |
| WO | WO 2016/157665 | A1 | 10/2016 |
| WO | WO 2018/139619 | A1 | 8/2018 |
| WO | WO 2020/213680 | A1 | 10/2020 |
| WO | WO 2020/213686 | A1 | 10/2020 |
| WO | WO 2020/213687 | A1 | 10/2020 |
| WO | WO 2020/213688 | A1 | 10/2020 |
| WO | WO 2021/060879 | A1 | 4/2021 |
| WO | WO 2021/125625 | A1 | 6/2021 |

OTHER PUBLICATIONS

Mariola Saternus et al., “Effect of Mg on the Formation of Periodic Layered Structure during Double Batch Hot Dip Process in Zn—Al Bath”, Materials, Mar. 1, 2021, vol. 14, No. 5, pp. 1-16.
Notice of Allowance issued in JP Application No. 2022-505253 mailed on Mar. 1, 2022.
Written Opinion of the International Searching Authority (Form PCT/ISA/237) for International Application No. PCT/JP2023/013666, dated May 30, 2023, with an English translation.

* cited by examiner

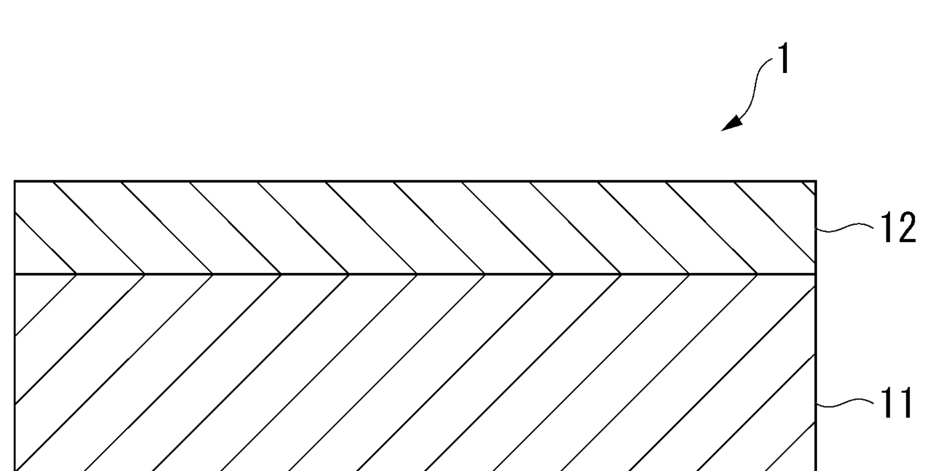
1
12
11

HOT-DIP PLATED STEEL MATERIAL

TECHNICAL FIELD OF THE INVENTION

The present invention relates to a hot-dip plated steel material.

The present application claims priority based on Japanese Patent Application No. 2022-046793 filed in Japan on Mar. 23, 2022, the contents of which are incorporated herein by reference.

RELATED ART

A steel material on the surface of which a hot-dip Zn-plated layer containing Al and Mg is formed (a hot-dip Zn—Al—Mg-based plated steel material) has excellent corrosion resistance. Therefore, hot-dip Zn—Al—Mg-based plated steel materials are widely used, for example, as a material for structural members required to have corrosion resistance, such as building materials.

For example, Patent Document 1 discloses a hot-dip plated steel sheet including: a steel sheet; and a hot-dip plated layer formed on a surface of the steel sheet, wherein the hot-dip plated layer contains Al: 0 to 90 mass % and Mg: 0 to 10 mass % in terms of average composition, and the remainder containing Zn and an impurity; and a pattern portion disposed so as to have a certain shape and a non-pattern portion are formed on the hot-dip plated layer, the pattern portion and the non-pattern portion each include one or two of a first region and a second region, the absolute value of the difference between the area ratio of the first region in the pattern portion and the area ratio of the first region in the non-pattern portion is 30% or more, and the first region has an orientation ratio of 3.5 or more and the second region has an orientation ratio of less than 3.5.

Patent Document 2 discloses a Zn—Al—Mg-based hot-dip plated steel sheet including: a steel sheet; and a hot-dip plated layer containing Al in an amount of 4 mass % or more and 22 mass % or less, Mg in an amount of 1 mass % or more and 5 mass % or less, and the remainder containing Zn and an unavoidable impurity, wherein the cross section of the hot-dip plated layer that is parallel to the surface of the hot-dip plated layer has a diffraction intensity ratio I(200)/I(111) of 0.8 or more, which is the ratio of X-ray diffraction intensity I(200) from the (200) plane of the Al phase to X-ray diffraction intensity I(111) from the (111) plane of the Al phase.

In recent years, hot-dip plated steel materials for building materials used for roofs, wall materials, and the like are required at a high level to have both planar section corrosion resistance, which is the corrosion resistance of the unpainted plated layer itself, and corrosion resistance after coating, which is the corrosion resistance of painted one. In the prior art, compatibility between planar section corrosion resistance and corrosion resistance after coating has hardly been studied.

Patent Document 1 discloses that, when the first region means a region having an intensity ratio of 3.5 or more between (0002) plane diffraction peak intensity $I_{0002}$ and (10-11) plane diffraction peak intensity $I_{10\text{-}11}$ in the Zn phase and the second region means a region the intensity ratio of which is less than 3.5, the difference between the area ratio of the first region in the pattern portion and the area ratio of the first region in the non-pattern portion is set to be 30% or more to intentionally express characters, designs, and the like on the surface of the plated layer. However, Patent Document 1 has not studied on corrosion resistance after coating.

Patent Document 2 discloses that, by controlling the orientation of the Al phase in the plated layer, the plated layer has an appearance like a pear skin, which has fine texture and a lot of smooth glossy part. However, corrosion resistance after coating has not been examined.

CITATION LIST

Patent Document

[Patent Document 1]
Japanese Unexamined Patent Application, First Publication No. 2021-85086
[Patent Document 2]
PCT International Publication No. WO 2011/001662

SUMMARY OF INVENTION

Problems to be Solved by the Invention

The present invention has been made in view of the above circumstances, and an object of the present invention is to provide a hot-dip plated steel material that is more excellent in both planar section corrosion resistance and corrosion resistance after coating.

Means for Solving the Problem

In order to solve the above problem, the present invention adopts the following configuration.

[1] A hot-dip plated steel material including:

a steel material; and a hot-dip plated layer disposed on a surface of the steel material, wherein the hot-dip plated layer has a chemical composition containing, in terms of mass %, Al: 10.0 to 30.0%, Mg: 3.0 to 15.0%, Fe: 0.01 to 15.0%, Si: 0 to 10.0%, Ni: 0 to 1.0%, and Ca: 0 to 4.0%, and further containing one or two or more elements selected from the element group consisting of Sb: 0 to 0.5%, Pb: 0 to 0.5%, Cu: 0 to 1.0%, Sn: 0 to 2.0%, Ti: 0 to 1.0%, Cr: 0 to 1.0%, Nb: 0 to 1.0%, Zr: 0 to 1.0%, Mn: 0 to 1.0%, Mo: 0 to 1.0%, Ag: 0 to 1.0%, Li: 0 to 1.0%, La: 0 to 0.5%, Ce: 0 to 0.5%, B: 0 to 0.5%, Y: 0 to 0.5%, P: 0 to 0.5%, Sr: 0 to 0.5%, Co: 0 to 0.5%, Bi: 0 to 0.5%, In: 0 to 0.5%, V: 0 to 0.5%, and W: 0 to 0.5%, in an amount of 5% or less in total, and the remainder: Zn and an impurity, and the hot-dip plated layer has a diffraction intensity obtained from a result of X-ray diffraction measurement, the diffraction intensity satisfying a relationship of the following formulas (1a) and (2a):

$$0.3 \le I(002)_{MgZn2}/\{I(100)_{MgZn2}+I(101)_{MgZn2}\} \le 3.0 \quad (1a)$$

$$5.0 < I(111)\alpha/I(200)_{\alpha} \le 40.0 \quad (2a)$$

wherein, in the formula (1a), $I(002)_{MgZn2}$ represents an $MgZn_2$ phase (002) diffraction intensity, $I(100)_{MgZn2}$ represents an $MgZn_2$ phase (100) diffraction intensity, and $I(101)_{MgZn2}$ represents an $MgZn_2$ phase (101) diffraction intensity, and in the formula (2a), I(111), represents an α phase (111) diffraction intensity and I(200), represents an α phase (200) diffraction intensity.

[2] A hot-dip plated steel material including:

a steel material; and a hot-dip plated layer disposed on a surface of the steel material, wherein the hot-dip plated layer has a chemical composition containing, in terms of mass %, Al: 15.0 to 30.0%, Mg: 5.0 to 10.0%, Fe: 0.01 to 15.0%, Si: 0 to 10.0%, Ni: 0 to 1.0%, and Ca: 0 to 4.0%, and further containing one or two or more elements selected from the element group consisting of Sb: 0 to 0.5%, Pb: 0 to 0.5%, Cu: 0 to 1.0%, Sn: 0 to 2.0%, Ti: 0 to 1.0%, Cr: 0 to 1.0%, Nb: 0 to 1.0%, Zr: 0 to 1.0%, Mn: 0 to 1.0%, Mo: 0 to 1.0%, Ag: 0 to 1.0%, Li: 0 to 1.0%, La: 0 to 0.5%, Ce: 0 to 0.5%, B: 0 to 0.5%, Y: 0 to 0.5%, P: 0 to 0.5%, Sr: 0 to 0.5%, Co: 0 to 0.5%, Bi: 0 to 0.5%, In: 0 to 0.5%, V: 0 to 0.5%, and W: 0 to 0.5%, in an amount of 5% or less in total, and the remainder: Zn and an impurity, and the hot-dip plated layer has a diffraction intensity obtained from a result of X-ray diffraction measurement, the diffraction intensity satisfying a relationship of the following formulas (1b) and (2b):

$$0.6 < I(002)_{MgZn2}/\{I(100)_{MgZn2}+I(101)_{MgZn2}\} \leq 3.0 \quad (1b)$$

$$5.0 < I(111)_{\alpha}/I(200)_{\alpha} \leq 40.0 \quad (2b)$$

wherein, in the formula (1a), $I(002)_{MgZn2}$ represents an $MgZn_2$ phase (002) diffraction intensity, $I(100)_{MgZn2}$ represents an $MgZn_2$ phase (100) diffraction intensity, and $I(101)_{MgZn2}$ represents an $MgZn_2$ phase (101) diffraction intensity, and in the formula (2b), $I(111)_{\alpha}$ represents an α phase (111) diffraction intensity and I(200), represents an α phase (200) diffraction intensity.

[3] The hot-dip plated steel material according to [1] or [2], wherein the chemical composition of the hot-dip plated layer contains Sn: 0.05 to 0.5% in terms of mass %, and the hot-dip plated layer has a result of X-ray diffraction measurement that an $Mg_2Sn$ phase is detected.

Effects of the Invention

According to the present invention, it is possible to provide a hot-dip plated steel material that is more excellent in both planar section corrosion resistance and corrosion resistance after coating.

BRIEF DESCRIPTION OF THE DRAWING

FIG. 1 is a schematic cross-sectional view of the hot-dip plated steel material according to an embodiment of the present invention.

EMBODIMENTS OF THE INVENTION

In a hot-dip plated steel material in which a coating film is formed on the surface of the plated layer, corrosion may progress along the interface between the plated layer and the coating film, and corrosion may further progress in a depth direction of the plated layer. As corrosion precedes at the interface between the plated layer and the coating film, coating film swelling may occur before the plated layer is lost due to corrosion. Therefore, in order to enhance the corrosion resistance after coating of the hot-dip plated steel material, it is necessary to suppress corrosion at the interface between the plated layer and the coating film. In addition, it is expected that, as a result of enhanced corrosion resistance after coating, corrosion of the plated layer itself is suppressed and planar section corrosion resistance is improved.

Therefore, the present inventors have conducted intensive studies in order to improve both the planar section corrosion resistance and corrosion resistance after coating of a hot-dip Zn-plated layer containing Al and Mg. The $MgZn_2$ phase and the α phase included in the plated layer each include a dense plane. For the $MgZn_2$ phase, which has a hexagonal crystal structure, the dense surface is the (002) plane. In addition, for the α phase, which contains Al and a small amount of Zn and has a face-centered cubic crystal structure, the dense plane is the (111) plane. Each of the $MgZn_2$ phase and the α phase has a property that the corrosion resistance of these crystal orientation planes corresponding to a dense plane is higher than the corrosion resistance of other crystal orientation planes.

Therefore, in order to achieve the above object, the present inventors have attempted to make the (002) plane as the dense plane of the $MgZn_2$ phase and the (111) plane as the dense plane of the α phase orient to be parallel to the surface of the hot-dip plated layer. As a result, it has been found that such a hot-dip plated layer significantly improves corrosion resistance after coating, and further, the planar section corrosion resistance of the hot-dip plated layer is improved.

In addition, it has been found that, when the X-ray diffraction intensity obtained from the X-ray diffraction measurement result for the surface of the plated layer satisfies the relationship of the following formula (1a) and the following formula (2), the crystal orientation of the $MgZn_2$ phase and the α phase orients in a certain direction, thereby such a hot-dip plated layer successfully improving both planar section corrosion resistance and corrosion resistance after coating. These findings led the present invention to be completed.

Hereinafter, the hot-dip plated steel material according to an embodiment of the present invention will be described.

The hot-dip plated steel material according to the present embodiment includes: a steel material; and a hot-dip plated layer disposed on a surface of the steel material, wherein the hot-dip plated layer has a chemical composition containing, in terms of mass %, Al: 10.0 to 30.0%, Mg: 3.0 to 15.0%, Fe: 0.01 to 15.0%, Si: 0 to 10.0%, Ni: 0 to 1.0%, and Ca: 0 to 4.0%, and further containing one or two or more elements selected from the element group consisting of Sb: 0 to 0.5%, Pb: 0 to 0.5%, Cu: 0 to 1.0%, Sn: 0 to 2.0%, Ti: 0 to 1.0%, Cr: 0 to 1.0%, Nb: 0 to 1.0%, Zr: 0 to 1.0%, Mn: 0 to 1.0%, Mo: 0 to 1.0%, Ag: 0 to 1.0%, Li: 0 to 1.0%, La: 0 to 0.5%, Ce: 0 to 0.5%, B: 0 to 0.5%, Y: 0 to 0.5%, P: 0 to 0.5%, Sr: 0 to 0.5%, Co: 0 to 0.5%, Bi: 0 to 0.5%, In: 0 to 0.5%, V: 0 to 0.5%, and W: 0 to 0.5%, in an amount of 5% or less in total, and the remainder: Zn and an impurity, and the hot-dip plated layer has a diffraction intensity obtained from a result of X-ray diffraction measurement, the diffraction intensity satisfying a relationship of the following formulas (1a) and (2):

$$0.3 \leq I(002)_{MgZn2}/\{I(100)_{MgZn2}+I(101)_{MgZn2}\} \leq 3.0 \quad (1a)$$

$$5.0 < I(111)_{\alpha}/I(200)_{\alpha} \leq 40.0 \quad (2)$$

wherein, in the formula (1a), $I(002)_{MgZn2}$ represents an $MgZn_2$ phase (002) diffraction intensity, $I(100)_{Mg7}n2$ represents an $MgZn_2$ phase (100) diffraction intensity, and $I(101)_{MgZn2}$ represents an $MgZn_2$ phase (101) diffraction intensity, and in the formula (2), I(111), represents an α phase (111) diffraction intensity and I(200), represents an α phase (200) diffraction intensity.

When the Al concentration and the Mg concentration in the chemical composition of the hot-dip plated layer are in the ranges of Al: 15.0 to 30.0% and Mg: 5.0 to 10.0%, respectively, it is preferable to satisfy the following formula (1b) together with the formula (2), instead of the formula (1a). When the Al concentration and the Mg concentration in the chemical composition of the hot-dip plated layer satisfy the ranges of Al: 10.0 to 30.0% and Mg: 3.0 to 15.0%, and satisfy the ranges of Al: 15.0 to 30.0% and Mg: 5.0 to 10.0%, respectively, it is only required to satisfy the formula (1a). When the Al concentration and the Mg concentration in the chemical composition of the hot-dip plated layer satisfy the ranges of Al: 10.0 to 30.0% and Mg: 3.0 to 15.0%, and satisfy the ranges of Al: 15.0 to 30.0% and Mg: 5.0 to 10.0%, respectively, it is preferable to satisfy the formula (1a) and additionally the following formula (1b).

$$0.6<I(002)_{MgZn2}/\{I(100)_{MgZn2}+I(101)_{MgZn2}\}\leq 3.0 \quad (1b)$$

In the following description, the expression "%" of the content of each element in a chemical composition means "mass %". The content of an element in a chemical composition may be referred to as an element concentration (for example, Zn concentration, Mg concentration, and the like). The "planar section corrosion resistance" indicates a property that the hot-dip plated layer (specifically, Zn—Al—Mg alloy layer) itself is less likely to corrode. The "corrosion resistance after coating" indicates a property that the hot-dip plated layer itself is hardly corroded when the surface of the plated layer is coated. The "hot-dip plated layer" means a plated film produced by the so-called hot-dip galvanizing.

As illustrated in FIG. 1, hot-dip plated steel material 1 according to the present embodiment includes steel material 11. The shape of steel material 11 is not particularly limited, and an example of steel material 11 is a steel sheet. In addition, steel material 11 may be, for example, a formed base steel material, such as a steel pipe, a civil engineering and construction material (fence culvert, corrugated pipe, drain channel lid, splash preventing plate, bolt, wire mesh, guard rail, water stop wall, and the like), a home electric appliance member (a housing of an outdoor unit of an air conditioner, or the like), and an automobile component (a suspension member, or the like). The forming is, for example, various plastic working methods, such as press working, roll forming, and bending.

The material of steel material 11 is not particularly limited. Steel material 11 may be, for example, various steel materials, such as general steel, Al-killed steel, ultra-low carbon steel, high carbon steel, various high tensile strength steels, and some high alloy steels (a steel containing a reinforcing element such as Ni, Cr, etc.). Steel material 11 may be a hot-rolled steel sheet, a hot-rolled steel strip, a cold-rolled steel sheet, a cold-rolled steel strip, and the like described in JIS G 3302: 2010. The method of manufacturing the steel sheet (hot rolling method, pickling method, cold rolling method, etc.), specific manufacturing conditions thereof, and the like are also not particularly limited.

In the present embodiment, the use of a pre-plated steel material is not excluded as steel material 11, but it is preferable to use a steel material that is not pre-plated. As described later, hot-dip plating is performed on a steel material that is not pre-plated, and the subsequent cooling conditions are controlled, so that the crystal orientation of each of the $MgZn_2$ phase and the α phase is easily oriented in a certain direction.

Hot-dip plated steel material 1 according to the present embodiment includes hot-dip plated layer 12 disposed on the surface of steel material 11. Hot-dip plated layer 12 of hot-dip plated steel material 1 according to the present embodiment is mainly composed of a Zn—Al—Mg alloy layer due to the chemical composition described later. In addition, hot-dip plated layer 12 of hot-dip plated steel material 1 according to the present embodiment may include an Al—Fe alloy layer between steel material 11 and the Zn—Al—Mg alloy layer. That is, hot-dip plated layer 12 may have a single-layer structure of the Zn—Al—Mg alloy layer or a multi-layer structure including the Zn—Al—Mg alloy layer and the Al—Fe alloy layer.

The chemical composition of the hot-dip plated layer according to the present embodiment is composed of Zn and other alloy elements. The chemical composition of the hot-dip plated layer will be described in detail below. Note that the elements the concentration of which has a lower limit of 0% as described are not essential for solving the problem of the hot-dip plated steel material according to the present embodiment, but are optional elements that are allowed to be included in the hot-dip plated layer for the purpose of, for example, improving characteristics.

<Al: 10.0 to 30.0%>

Al forms an α-phase that is a solid solution with Zn, and contributes to improvement in planar section corrosion resistance, corrosion resistance after coating, and workability. Therefore, the Al concentration is 10.0% or more. The Al concentration may be 11.0% or more, 12.0% or more, or 15.0% or more. On the other hand, when Al is excessive, the Mg concentration and the Zn concentration relatively decrease, and planar section corrosion resistance and corrosion resistance after coating are deteriorated. Therefore, the Al concentration is 30.0% or less. The Al concentration may be 28.0% or less, 25.0% or less, or 20.0% or less.

<Mg: 3.0 to 15.0%>

Mg is an element essential for securing planar section corrosion resistance and corrosion resistance after coating. Therefore, the Mg concentration is 3.0% or more. The Mg concentration may be 4.0% or more, 5.0% or more, or 6.0% or more. On the other hand, when the Mg concentration is excessive, workability, particularly powdering resistance, may be deteriorated, and planar section corrosion resistance and corrosion resistance after coating may be further deteriorated. Therefore, the Mg concentration is 15.0% or less. The Mg concentration may be 12.0% or less, 10.0% or less, or 8.0% or less.

<Fe: 0.01% to 15.0%>

The Fe concentration may be 0%. On the other hand, Fe may be contained in the hot-dip plated layer in an amount of 0.01% or more. It has been confirmed that, when the Fe concentration is 15.0% or less, the performance of the hot-dip plated layer is not adversely affected. The Fe concentration may be, for example, 0.05% or more, 0.10% or more, 0.5% or more, or 1.0% or more. The Fe concentration may be, for example, 10.0% or less, 8.0% or less, or 6.0% or less. Since Fe may be mixed from the base steel sheet, the Fe concentration may be 0.05% or more.

<Si: 0% to 10.0%>

The Si concentration may be 0%. On the other hand, Si contributes to improvement in planar section corrosion resistance. Therefore, the Si concentration may be 0.05% or more, 0.1% or more, 0.2% or more, or 0.5% or more. On the other hand, when the Si concentration is excessive, planar section corrosion resistance and corrosion resistance after coating deteriorate. Therefore, the Si concentration is 10.0% or less. The Si concentration may be 8.0% or less, 7.0% or less, or 6.0% or less.

<Ni: 0 to 1.0%>

The Ni concentration may be 0%. On the other hand, Ni contributes to improvement in planar section corrosion resistance and corrosion resistance after coating. Therefore, the Ni concentration may be 0.05% or more, 0.08% or more, or 0.1% or more. On the other hand, when the Ni concentration is excessive, planar section corrosion resistance and corrosion resistance after coating deteriorate. Therefore, the Ni concentration is 1.0% or less. The Ni concentration may be 0.8% or less, 0.6% or less, or 0.5% or less.

<Ca: 0% to 4.0%>

The Ca concentration may be 0%. On the other hand, Ca is an element capable of adjusting the optimum Mg elution amount for imparting planar section corrosion resistance. Therefore, the Ca concentration may be 0.05% or more, 0.1% or more, or 0.5% or more. On the other hand, when the Ca concentration is excessive, planar section corrosion resistance and workability are deteriorated. Therefore, the Ca concentration is 4.0% or less. The Ca concentration may be 3.5% or less, 3.0% or less, or 2.8% or less.

Furthermore, the hot-dip plated layer according to the present embodiment may contain one or two or more elements selected from the element group consisting of Sb: 0 to 0.5%, Pb: 0 to 0.5%, Cu: 0 to 1.0%, Sn: 0 to 2.0%, Ti: 0 to 1.0%, Cr: 0 to 1.0%, Nb: 0 to 1.0%, Zr: 0 to 1.0%, Mn: 0 to 1.0%, Mo: 0 to 1.0%, Ag: 0 to 1.0%, Li: 0 to 1.0%, La: 0 to 0.5%, Ce: 0 to 0.5%, B: 0 to 0.5%, Y: 0 to 0.5%, P: 0 to 0.5%, Sr: 0 to 0.5%, Co: 0 to 0.5%, Bi: 0 to 0.5%, In: 0 to 0.5%, V: 0 to 0.5%, and W: 0 to 0.5%. The total of these elements is 0% or more and 5% or less. If the total exceeds 5%, planar section corrosion resistance or corrosion resistance after coating may be reduced.

<Sb, Pb: 0 to 0.5% Each>

The concentration of Sb and Pb may be 0%. On the other hand, Sb and Pb contribute to improvement in corrosion resistance after coating. Therefore, the concentration of each of Sb and Pb may be 0.05% or more, 0.10% or more, or 0.15% or more. On the other hand, when the concentration of Sb and Pb are excessive, planar section corrosion resistance is deteriorated. Therefore, the concentration of each of Sb and Pb is 0.5% or less. The concentration of each of Sb and Pb may be 0.4% or less, 0.3% or less, or 0.25% or less.

<Cu, Ti, Cr, Nb, Zr, Mn, Mo, Ag and Li: 0 to 1.0% Each>

The concentration of each of Cu, Ti, Cr, Nb, Zr, Mn, Mo, Ag, and Li may be 0%. On the other hand, they contribute to improvement in corrosion resistance after coating. Therefore, the concentration of each of Cu, Ti, Cr, Nb, Zr, Mn, Mo, Ag, and Li may be 0.05% or more, 0.08% or more, or 0.10% or more. On the other hand, when the concentration of Cu, Ti, Cr, Nb, Zr, Mn, Mo, Ag, and Li are excessive, planar section corrosion resistance is deteriorated. Therefore, the concentration of each of Cu, Ti, Cr, Nb, Zr, Mn, Mo, Ag, and Li is 1.0% or less. The concentration of each of Cu, Ti, Cr, Nb, Zr, Mn, Mo, Ag, and Li may be 0.8% or less, 0.7% or less, or 0.6% or less.

<Sn: 0 to 2.0%>

The Sn concentration may be 0%. On the other hand, Sn is an element that forms an intermetallic compound with Mg and improves the corrosion resistance after coating of the hot-dip plated layer. Therefore, the Sn concentration may be 0.05% or more, 0.10% or more, 0.20% or more, or 0.30% or more. However, when the Sn concentration is excessive, planar section corrosion resistance is deteriorated. Therefore, the Sn concentration is 2.0% or less. The Sn concentration may be 0.8% or less, 0.7% or less, 0.6% or less, or 0.5% or less.

<La, Ce, B, Y, P, and Sr: 0 to 0.5% Each>

The concentration of each of La, Ce, B, Y, P, and Sr may be 0%. On the other hand, La, Ce, B, Y, P, and Sr contribute to improvement in corrosion resistance after coating. Therefore, the concentration of each of La, Ce, B, Y, P, and Sr may be 0.10% or more, 0.15% or more, or 0.20% or more. On the other hand, when the concentration of each of La, Ce, B, Y, P, and Sr are excessive, planar section corrosion resistance deteriorates. Therefore, the concentration of each of La, Ce, B, Y, P, and Sr is 0.5% or less. The concentration of each of La, Ce, B, Y, P, and Sr may be 0.4% or less or 0.3% or less.

<Co, Bi, In, V, and W: 0 to 0.5% Each>

The concentration of each of Co, Bi, In, V, and W may be 0%. On the other hand, Co, Bi, In, V, and W contribute to improvement in corrosion resistance after coating. Therefore, the concentration of each of Co, Bi, In, V, and W may be 0.10% or more, 0.15% or more, or 0.20% or more. On the other hand, when the concentration of each of Co, Bi, In, V, and W is excessive, planar section corrosion resistance is deteriorated. Therefore, the concentration of each of Co, Bi, In, V, and W is 0.5% or less. The concentration of each of Co, Bi, In, V, and W may be 0.4% or less or 0.3% or less.

<Remainder: Zn and Impurity>

The remainder of the components of the hot-dip plated layer according to the present embodiment is Zn and an impurity. Zn is an element that brings planar section corrosion resistance and corrosion resistance after coating to the hot-dip plated layer. The impurity refers to a component that is contained in a raw material or mixed in a manufacturing process and not intentionally contained. For example, in the hot-dip plated layer, a small amount of components other than Fe may be mixed as the impurity due to mutual atomic diffusion between the steel material and the plating bath.

The chemical composition of the hot-dip plated layer is measured by the following method. First, an acid solution in which the hot-dip plated layer is peeled off and dissolved is obtained using an acid containing an inhibitor that suppresses steel material corrosion. Next, the obtained acid solution is subjected to inductively coupled plasma (ICP) analysis. Thereby, the chemical composition of the hot-dip plated layer can be determined. The acid species is not particularly limited as long as it is an acid capable of dissolving the hot-dip plated layer. The chemical composition measured by the above-described means is an average chemical composition of the entire hot-dip plated layer.

Next, the metallographic structure of the hot-dip plated layer will be described.

The metallographic structure of the hot-dip plated layer contains an α phase and an $MgZn_2$ phase. The α phase and the $MgZn_2$ phase improve the planar section corrosion resistance of the hot-dip plated layer. In addition, as will be described later, the α phase and the $MgZn_2$ phase orient in a certain direction, and the hot-dip plated steel material is improved in corrosion resistance after coating and also in planar section corrosion resistance.

The area ratio of the α phase in the hot-dip plated layer is preferably 15 to 80%. The area ratio of the $MgZn_2$ phase is preferably 5 to 60%. The total area ratio of the α phase and the $MgZn_2$ phase is preferably 20% or more and 100% or less. However, the area ratio range is an example, and the area fraction of the hot-dip plated layer structure according to the present invention is not limited to this range. The hot-dip plated layer is only required to satisfy at least one of the formulae (Ta) and (1b) described below; and the formula (2).

In addition, when 0.05 to 0.5% of Sn is contained in the hot-dip plated layer, the $Mg_2Sn$ phase is reliably contained in the hot-dip plated layer. Since the amount of the $Mg_2Sn$ phase is small, the presence thereof is confirmed by X-ray diffraction measurement. When the hot-dip plated layer contains the $Mg_2Sn$ phase therein, the hot-dip plated layer has more improved corrosion resistance after coating.

The hot-dip plated layer may contain α phase other than the α phase and the $MgZn_2$ phase as the remainder. For example, the hot-dip plated layer having the above-described chemical composition may include an q-Zn phase, an Al—Ca—Si phase, and the like. When the α phase and the $MgZn_2$ phase are contained in an amount within the above ranges, planar section corrosion resistance and corrosion resistance after coating can be secured. Therefore, the configuration of phases or structures other than the α phase and the $MgZn_2$ phase is not particularly limited.

Next, the crystal orientation of the α phase and the $MgZn_2$ phase will be described.

In the hot-dip plated layer of the present embodiment, when the X-ray diffraction intensity obtained from the X-ray diffraction measurement result of the hot-dip plated layer satisfies the relationship of the following formulas (1a) and (2), the crystal orientation of the $MgZn_2$ phase and the α phase is oriented in a certain direction as described later, thereby improving both corrosion resistance after coating and planar section corrosion resistance.

$$0.3 \leq I(002)_{MgZn2}/\{I(100)_{MgZn2}+I(101)_{MgZn2}\} \leq 3.0 \quad (1a)$$

$$5.0 < I(111)_{\alpha}/I(200)_{\alpha} \leq 40.0 \quad (2)$$

When the Al concentration and the Mg concentration in the chemical composition of the hot-dip plated layer are in the ranges of Al: 15.00 to 30.00% and Mg: 5.00 to 10.00%, respectively, it is preferable to satisfy the following formula (1b) together with the formula (2), instead of the formula (1a). When the Al concentration and the Mg concentration in the chemical composition of the hot-dip plated layer satisfy the ranges of Al: 10.0 to 30.0% and Mg: 3.0 to 15.0%, and satisfy the ranges of Al: 15.0 to 30.0% and Mg: 5.0 to 10.0%, respectively, it is only required to satisfy the formula (1a). When the Al concentration and the Mg concentration in the chemical composition of the hot-dip plated layer satisfy the ranges of Al: 10.0 to 30.0% and Mg: 3.0 to 15.0%, and satisfy the ranges of Al: 15.0 to 30.0% and Mg: 5.0 to 10.0%, respectively, it is preferable to satisfy the formula (1a) and additionally the following formula (1b).

$$0.6 < I(002)_{MgZn2}/\{I(100)_{MgZn2}+I(101)_{MgZn2}\} \leq 3.0 \quad (1b)$$

In the formula (1a) and the formula (1b), $I(002)_{MgZn2}$ represents an $MgZn_2$ phase (002) diffraction intensity, $I(100)_{MgZn2}$ represents an $MgZn_2$ phase (100) diffraction intensity, and $I(101)_{MgZn2}$ represents an $MgZn_2$ phase (101) diffraction intensity. In the formula (2), $I(111)n$ represents an α phase (111) diffraction intensity and $I(200)n$ represents an α phase (200) diffraction intensity.

As shown in the formula (1a), when $I(100)_{MgZn2}/\{I(002)_{MgZn2}+I(101)_{MgZn2}\}$ is 0.3 or more, the (002) plane as the dense plane of the $MgZn_2$ phase is oriented to be parallel to the surface of the hot-dip plated layer. It is preferable to have more than 0.6 as shown in the formula (1b) when the Al concentration is 15.0 to 30.0% and the Mg concentration is 5.0 to 10.0%. As $I(100)_{MgZn2}/\{I(002)_{MgZn2}+I(101)_{MgZn2}\}$ is higher, the (002) plane as the dense plane of the $MgZn_2$ phase is aligned parallel to the surface of the hot-dip plated layer.

On the other hand, the upper limit of $I(100)_{MgZn2}/\{I(002)_{MgZn2}+I(101)_{MgZn2}\}$ is 3.0 or less. Even when the orientation of the dense surface of the $MgZn_2$ phase is maximally enhanced, the upper limit is 3.0.

When $I(111)_{\alpha}/I(200)_{\alpha}$ in the formula (2) is more than 5.0, the (111) plane as the dense plane of the α phase is oriented to be parallel to the surface of the hot-dip plated layer. As $I(111)_{\alpha}/I(200)_{\alpha}$ is higher, the (111) plane as the dense plane of the α phase is aligned parallel to the surface of the hot-dip plated layer.

On the other hand, the upper limit of $I(111)_{\alpha}/I(200)_{\alpha}$ is 40.0 or less. Even when the orientation of the dense plane of the α phase is maximally enhanced, the upper limit is 40.0.

The reason why both the corrosion resistance after coating and planar section corrosion resistance of the hot-dip plated layer satisfying the above formulas (1a) or (1b); and (2) are improved is presumed as follows.

For the $MgZn_2$ phase, which has a hexagonal crystal structure, the dense surface is the (002) plane. In addition, for the α phase, which contains Al and a small amount of Zn and has a face-centered cubic crystal structure, the dense plane is the (111) plane. Each of the $MgZn_2$ phase and the α phase has a property that the corrosion resistance of these crystal orientation planes corresponding to a dense plane is higher than the corrosion resistance of other crystal orientation planes. In the hot-dip plated layer satisfying at least one of the formulas (1a) and (1b); and the formula (2), the dense plane of each of the $MgZn_2$ phase and the α phase is oriented to be parallel to the surface of the hot-dip plated layer.

In a hot-dip plated steel material in which a coating film is formed on the surface of the hot-dip plated layer, corrosion may progress along the interface between the plated layer and the coating film. However, it is considered that, when the dense plane of each of the $MgZn_2$ phase and the α phase in the hot-dip plated layer is oriented to be parallel to the surface of the hot-dip plated layer, the corrosion resistance of the interface between the hot-dip plated layer and the coating film is remarkably enhanced and corrosion resistance after coating is remarkably improved.

In a hot-dip plated steel material, corrosion may progress from the surface of the hot-dip plated layer. However, it is considered that, when the dense plane of each of the $MgZn_2$ phase and the α phase is oriented to be parallel to the surface of the hot-dip plated layer as described above, the corrosion resistance of the surface of the hot-dip plated layer is remarkably enhanced and planar section corrosion resistance is remarkably improved.

The method for measuring the area fraction of the $MgZn_2$ phase is as follows. The surface of the hot-dip plated layer of a sample cut into 30 mm×30 mm is adjusted to be flat by mechanical polishing (for example, polishing with emery paper #2000). Next, the surface of the plated layer is chemically polished by colloidal polishing, and the polishing is continued until the surface becomes a mirror surface state. The surface of the plated layer after polishing is observed with a scanning electron microscope (SEM). Specifically, an element distribution image is captured using scanning electron microscope-energy dispersive spectroscopy (SEM-EDS) at a magnification of 5000 times. In this element distribution image, α phase in which Mg and Zn coexist is specified as the $MgZn_2$ phase. In the present specification, a region of Mg: 20 to 40 at % and Zn: 50 to 80 at % is determined as α phase ($MgZn_2$ phase) in which Mg and Zn coexist. After the $MgZn_2$ phase is identified, the area fraction of the α phase and the $MgZn_2$ phase included in the field of view is calculated through binarization using image analysis software.

The method for measuring the area fraction of the α phase is as follows. The surface of the hot-dip plated layer of a sample cut into 30 mm×30 mm is adjusted to be flat by mechanical polishing. Next, the surface of the plated layer is chemically polished by colloidal polishing, and the polishing is continued until the surface becomes a mirror surface state. The surface of the plated layer after polishing is observed by SEM. Specifically, an element distribution image is captured using SEM-EDS at a magnification of 5000 times. In this element distribution image, α phase in which Al and Zn coexist is specified as the α phase. In the present specification, a region of Al: 40 to 95 at % and Zn: 0.5 to 50 at % is determined as α phase (α phase) in which Al and Zn coexist. After the α phase is identified, the area fraction of the α phase contained in the field of view is calculated through binarization using image analysis software.

The method for measuring $I(002)_{MgZn2}/\{I(100)_{MgZn2}+I(101)_{MgZn2}\}$ in the formula (1a) and the formula (1b) is as follows. First, the surface of the hot-dip plated layer is mirror-polished and chemically polished as necessary. Next, for example, X-ray diffraction measurement is performed using an X-ray diffractometer (manufactured by Rigaku Corporation (model number RINT-TTR III) under the conditions of X-ray output: 50 kV and 300 mA; copper target; goniometer TTR (horizontal goniometer); slit width of Kβ filter: 0.05 mm; longitudinal limiting slit width: 2 mm; light receiving slit width: 8 mm; and light receiving slit 2: open, and under the measurement conditions of scan speed: 5 deg./min; step width: 0.01 deg; and scan axis: 2θ (5 to 90°). Then, for the $MgZn_2$ phase, the diffraction intensity (maximum intensity in the range of 19.67±0.2°) from the (100) plane, the diffraction intensity (maximum intensity in the range of 20.78±0.2°) from the (002) plane, and the diffraction intensity (maximum intensity in the range of 20.78±0.2°) from the (101) plane are measured, respectively. The diffraction intensity is an intensity excluding the background intensity. From the obtained diffraction intensity, $I(002)_{MgZn2}/\{I(100)_{MgZn2}+I(101)_{MgZn2}\}$ is determined.

The method for measuring $I(111)_\alpha/I(200)_\alpha$ in the formula (2) is as follows. First, the surface of the hot-dip plated layer is mirror-polished and chemically polished as necessary. Next, for example, X-ray diffraction measurement is performed using the same X-ray diffractometer and measurement conditions as described above. Then, for the α phase, the diffraction intensity (maximum intensity in the range of 38.47±0.2°) from the (111) plane and the diffraction intensity (maximum intensity in the range of 44.74±0.2°) from the (200) plane are measured, respectively. The diffraction intensity is an intensity excluding the background intensity. From the obtained diffraction intensity, $I(111)_\alpha/I(200)$, is obtained.

Whether or not the $Mg_2Sn$ phase is contained in the hot-dip plated layer is determined by whether or not a diffraction peak specific to $Mg_2Sn$ appears when the X-ray diffraction measurement is performed.

The adhesion amount per one surface of the hot-dip plated layer may be, for example, within a range of 20 to 150 g/$m^2$. When the adhesion amount per one surface is 20 g/$m^2$ or more, the planar section corrosion resistance and corrosion resistance after coating of the hot-dip plated steel material can be further enhanced. On the other hand, when the adhesion amount per one surface is 150 g/$m^2$ or less, the workability of the hot-dip plated steel material can be further improved.

Next, the method for producing a hot-dip plated steel material according to the present embodiment will be described, but the method for producing a hot-dip plated steel material according to the present embodiment is not particularly limited. For example, according to the manufacturing conditions described below, the hot-dip plated steel material according to the present embodiment can be obtained.

As for the production method of the hot-dip plated steel material according to the present embodiment, a steel material is annealed in a reducing atmosphere, and the steel material immediately after the annealing is immersed in a hot-dip plating bath and then pulled up to form a hot-dip plated layer on the surface of the steel material. Subsequently, cooling is performed by spraying a cooling gas until the temperature of the hot-dip plated layer reaches 300° C. or lower from the bath temperature.

Specifically, the steel material as an original sheet to be plated is annealed in a reducing atmosphere. The reducing atmosphere and the annealing conditions are not particularly limited. By this annealing, the oxide present on the surface of the steel material is removed as much as possible.

Subsequently, the steel material immediately after annealing is immersed in a hot-dip plating bath. The chemical composition of the hot-dip plating bath may be appropriately adjusted so as to obtain the chemical composition of the hot-dip plated layer described above. The temperature of the hot-dip plating bath is also not particularly limited. It is possible to appropriately select a temperature at which hot-dip plating can be performed. For example, the plating bath temperature may be higher than the melting point of the plating bath by about 20° C. or more.

Next, the steel material is pulled up from the hot-dip plating bath. The adhesion amount of the hot-dip plated layer can be controlled by controlling the pulling speed of the steel material. If necessary, wiping may be performed on the steel material to which the hot-dip plated layer is adhered to control the adhesion amount of the hot-dip plated layer. The adhesion amount of the hot-dip plated layer is not particularly limited, and can be, for example, within the above-described range.

Next, the hot-dip plated layer is cooled. The cooling is performed by spraying a cooling gas on the steel material immediately after being pulled up from the hot-dip plating bath. The cooling by spraying a cooling gas is continuously performed until the temperature of the hot-dip plated layer reaches 300° C. from the bath temperature. The cooling condition at less than 300° C. is not particularly limited. The cooling of spraying a cooling gas may be subsequently performed, or natural cooling may be performed.

The temperature to start the cooling is: "the temperature of the hot-dip plating bath − 40° C." or more; and the temperature of the hot-dip plating bath or less. When the temperature to start the cooling is lower than "the temperature of the hot-dip plating bath −40° C.", the plating is cooled (for example, a cooling rate of 2° C./s) before the cooling starts. For this reason, a lot of nucleation are formed within the hot-dip plating before the hot-dip plating is cooled. For this reason, it is difficult to control the orientation of the α phase and the $MgZn_2$ phase in the hot-dip plated layer in the subsequent steps.

In the cooling by spraying a cooling gas, a cooling zone is disposed along the conveyance path for the steel material. The cooling zone includes a plurality of spraying nozzles for cooling gas. When the flux is 5000 L/min/$m^2$ or more, the hot-dip plated layer can be cooled to 300° C. or less in a relatively short time. When the flux is less than 5000 L/min/$m^2$, the flow rate of the cooling gas is reduced while keeping the cooling rate of the entire steel material, which means that the temperature of the cooling gas is reduced. As a result, the liquid phase on the surface of the plated layer is overcooled to form a solidified core and increase a crystallized product in number, resulting in failure to control the orientation. When the flux is 25000 L/min/$m^2$ or less, the steel material can be cooled without being vibrated.

The cooling gas to be sprayed is not particularly limited, and may be a non-oxidizing gas such as nitrogen, an inert gas such as argon, or air, or a mixed gas thereof.

When the flux of the cooling gas is controlled, the shape of the gas nozzle from which the cooling gas is blown out is, for example, in the range of a diameter of 1 to 50 mm. The angle formed by the tip of the gas nozzle and the steel sheet surface is, for example, in the range of 70 to 110°, more preferably 900 (perpendicular). The distance between the tip of the gas nozzle and the steel sheet is in the range of 30 to 1000 mm. The shape, angle, and distance of the gas nozzle are merely examples, and are not limited to the above ranges.

By cooling the hot-dip plated layer so as to satisfy the above conditions, the hot-dip plated layer satisfying: at least one of the above formulas (1a) and (1b); and the formula (2) can be formed. The reason is presumed as follows.

In the above production method, the steel material just before being immersed in the hot-dip plating bath is annealed in a reducing atmosphere to remove oxides on the surface of the steel material, thereby reducing nucleation sites. When such a steel material is hot-dip plated, Fe in the steel material and Al in the hot-dip plating bath react with each other to form an Al—Fe alloy layer on the surface of the steel material. The Al—Fe alloy layer has relatively few nucleation sites. Further, after hot-dip plating, the cooling gas is sprayed at a flux of 5000 L/min/$m^2$ or more and 25000 L/nin/$m^2$ or less for cooling so as not to apply vibration to the steel material as much as possible, thereby further suppressing generation of nucleation sites. As a result, it is presumed that the α phase and the $MgZn_2$ phase in the hot-dip plated layer are oriented in a certain direction to satisfy the above formula (1a) or (1b); and the above formula (2).

Examples

Hereinafter, embodiments of the present invention will be described. However, the conditions in Examples are merely one condition example adopted to confirm the operability and effects of the present invention. The present invention is not limited to this one condition example. The present invention can adopt various conditions as long as the object of the present invention is achieved without departing from the gist of the present invention.

A steel material annealed under conditions of a soaking temperature of 800° C. and a soaking time of 2 minutes in a $N_2$-4% $H_2$ atmosphere was immersed in various hot-dip plating baths and pulled up to adhere a hot-dip plated layer to the surface of the steel material. Then the hot-dip plated layer was cooled by spraying a cooling gas from immediately after the pulling up from the hot-dip plating bath and until the temperature of the hot-dip plated layer reached 300° C. Thereby various hot-dip plated steel materials were produced. When the cooling gas was sprayed, the gas flux was controlled as shown in Table 2. The shape of the gas nozzle from which the cooling gas was blown out had a diameter of 6 mm, the angle formed by the tip of the gas nozzle and the steel sheet was the perpendicular, and the distance between the tip of the gas nozzle and the steel sheet was 35 mm.

The chemical composition of the hot-dip plated layer was as shown in Table 1. The production conditions were as shown in Table 2. The metallographic structure of the plated layer was evaluated, and the results are shown in Table 2. Furthermore, the surface corrosion resistance and corrosion resistance after coating of the hot-dip plated steel material were evaluated, and the results are shown in Table 3.

The chemical composition of the hot-dip plated layer and the metallographic structure of the hot-dip plated layer were evaluated by the means described above.

Planar section corrosion resistance was evaluated as follows. The obtained hot-dip plated steel material was cut into 100 mm×50 mm and subjected to an evaluation test of planar section corrosion resistance. The planar section corrosion resistance was evaluated by the corrosion acceleration test specified in JASO-CCT-M609. After 120 cycles, the corrosion loss was compared. The evaluation criteria were as follows, and "AAA", "AA", and "A" were regarded as acceptable.

AAA: corrosion loss of less than 40 g/$m^2$

AA: corrosion loss of 40 g/$m^2$ or more and less than 60 g/$m^2$

A: corrosion loss of 60 g/$m^2$ or more and less than 80 g/$m^2$

B: corrosion loss of 80 g/$m^2$ or more

Corrosion resistance after coating (coating film peeling after coating) was evaluated as follows. The obtained hot-dip plated steel material was cut into 100 mm×50 mm and subjected to a test of corrosion resistance after coating. A chemical conversion treatment layer having a film thickness of 1.2 μm was formed on the test piece, and a coating film layer having a film thickness of 20 μm was formed. Thereafter, a cut flaw reaching the base metal was imparted to the front surface with a cutter knife, and 120 cycles of CCT with a cycle of SST: 4 hr→drying: 2 hr→wetting: 2 hr were performed for evaluation. Determination was made according to the maximum swelling width on one side of the cut flaw after the test ended. Details of the chemical conversion treatment layer and the coating film layer were as follows.

<Chemical Conversion Treatment Layer>

A chromate-free chemical conversion treatment solution obtained by mixing a silane coupling agent, tannic acid, silica, and a polyester resin was applied to the plated layer, and dried to form a chemical conversion treatment film.

<Coating Film Layer>

A primer coating material resin and a topcoat coating material resin described below were applied onto the chemical conversion treatment film to form a coating film layer. The thickness of the layer formed of the primer coating material resin was 5 μm, the thickness of the layer formed of the topcoat coating material resin was 15 μm, and the total thickness was 20 m.

<Film-Forming Component of Coating Film Layer>

(1) Primer Coating Material Resin on Front Surface and Rear Surface

Combined curing type of polyester/melamine+isocyanate (FLC687 coating material resin manufactured by Nippon Fine Coatings Inc.)

(2) Topcoat Coating Material Resin on Front Surface

Polymer polyester/melamine curing type (FLC7000 coating material resin manufactured by Nippon Fine Coatings Inc.)

(3) Topcoat Coating Material Resin on Rear Surface

Polyester/melamine curing type (FLC100HQ coating material resin manufactured by Nippon Fine Coatings Inc.)

Evaluation criteria for corrosion resistance after coating are shown below. Determination was made according to the following scoring. "AAA", "AA", and "A" were regarded as acceptable.

AAA: maximum swelling width of less than 5 mm

AA: maximum swelling width of 5 mm or more and less than 8 mm

A: maximum swelling width of 8 mm or more and less than 10 mm

B: maximum swelling width of 10 mm or more

No. 1 to 25 (examples) according to the present invention, in which the chemical composition and the metallographic structure of the hot-dip plated layer were appropriately controlled, were excellent in both planar section corrosion resistance and corrosion resistance after coating. In Examples, the adhesion amount of the hot-dip plated layer was within a range of 20 to 150 g/$m^2$.

No. 26 as a comparative example had an insufficient Al amount in its hot-dip plated layer. Therefore, No. 26 had an insufficient planar section corrosion resistance.

No. 27 as a comparative example had an excessive Al amount in its hot-dip plated layer. Therefore, No. 27 had an insufficient corrosion resistance after coating.

No. 28 as a comparative example had an insufficient Mg amount in its hot-dip plated layer. Therefore, No. 28 was insufficient in both planar section corrosion resistance and corrosion resistance after coating.

No. 29 as a comparative example had an excessive Mg amount in its hot-dip plated layer. Therefore, No. 29 had an insufficient planar section corrosion resistance.

No. 30 as a comparative example had an excessive Si amount in its hot-dip plated layer. Therefore, No. 30 was insufficient in both planar section corrosion resistance and corrosion resistance after coating.

No. 31 as a comparative example had an excessive Sn amount in its hot-dip plated layer. Therefore, No. 31 was insufficient in both planar section corrosion resistance and corrosion resistance after coating.

No. 32 as a comparative example had an excessive Ca amount in its hot-dip plated layer. Therefore, No. 30 was insufficient in both planar section corrosion resistance and corrosion resistance after coating.

No. 33 as a comparative example had an insufficient gas flux amount of the cooling gas. Therefore, the α phase and the $MgZn_2$ phase were not oriented in a certain direction in No. 33. Therefore, No. 33 was insufficient in both planar section corrosion resistance and corrosion resistance after coating.

No. 34 as a comparative example had an excessive gas flux of the cooling gas. Therefore, the α phase and the $MgZn_2$ phase were not oriented in a certain direction in No. 34. Therefore, No. 34 was insufficient in both planar section corrosion resistance and corrosion resistance after coating. When No. 34 as a comparative example was compared with Nos. 12, 22, and 23 as examples, the cooling rates of both were relatively close to each other, but No. 34 had an excessive gas flux, failing to satisfy the scope of the invention.

No. 35 and No. 36 as comparative examples had an insufficient gas flux of the cooling gas. The temperature of the cooling gas was too low, and the liquid phase on the surface of the plated layer was overcooled to form a lot of solidified nuclei. Therefore, the α phase and the $MgZn_2$ phase were not oriented in a certain direction in No. 35 and No. 36. Therefore, No. 35 and No. 36 were insufficient in both planar section corrosion resistance and corrosion resistance after coating.

In No. 37 as a comparative example, the temperature to start the cooling was too low, and a lot of nuclei were generated. Therefore, the ax phase and the $MgZn_2$ phase were not oriented in a certain direction in No. 37. Therefore, No. 37 was insufficient in both planar section corrosion resistance and corrosion resistance after coating.

TABLE 1

| | | Plated layer components (mass %) remainder: Zn and impurity | | | | | | | | | |
|---|---|---|---|---|---|---|---|---|---|---|---|
| | | | | | | | | | | Other elements | |
| Classification | No. | Zn | Al | Mg | Sn | Si | Ca | Ni | Fe | Type | Total (%) |
| Example | 1 | Remainder | 10 | 3 | 0 | 0 | 0 | 0 | 0.1 | — | — |
| Example | 2 | Remainder | 11 | 3 | 0.07 | 0 | 0 | 0 | 0.05 | Co | 0.01 |
| Example | 3 | Remainder | 10 | 5 | 0.07 | 0.1 | 0.1 | 0 | 0.1 | Bi | 0.005 |
| Example | 4 | Remainder | 11 | 5 | 0.01 | 0.2 | 0.1 | 0 | 0.1 | — | — |
| Example | 5 | Remainder | 11 | 6 | 0 | 0.2 | 0.1 | 0 | 0.08 | Sb | 0.08 |
| Example | 6 | Remainder | 13 | 3 | 0 | 0.1 | 0 | 0 | 0.1 | Li | 0.02 |
| Example | 7 | Remainder | 15 | 3 | 0.1 | 0.1 | 0 | 0 | 0.2 | Ag | 0.01 |
| Example | 8 | Remainder | 17 | 5 | 0.1 | 0 | 0.1 | 0.001 | 0.3 | P | 0.01 |
| Example | 9 | Remainder | 18 | 6 | 2.0 | 0 | 0.1 | 0 | 0.2 | Mn | 0.02 |
| Example | 10 | Remainder | 19 | 6 | 0.1 | 0 | 0.1 | 0 | 0.1 | Sr | 0.05 |
| Example | 11 | Remainder | 19 | 6 | 0.1 | 0.2 | 0.2 | 0 | 0.1 | — | — |
| Example | 12 | Remainder | 19 | 6 | 0.05 | 0.2 | 0.2 | 0 | 0.1 | Pb | 0.03 |
| Example | 13 | Remainder | 19 | 7 | 0.1 | 0.2 | 0.2 | 0 | 0.1 | In | 0.02 |
| Example | 14 | Remainder | 20 | 15 | 0 | 0.2 | 1.5 | 0 | 0.1 | V | 0.01 |
| Example | 15 | Remainder | 20 | 6 | 0 | 0.1 | 0.3 | 0 | 0.1 | B | 0.01 |
| Example | 16 | Remainder | 20 | 3 | 0 | 0.2 | 0.3 | 0 | 1.3 | Nb | 0.01 |
| Example | 17 | Remainder | 22 | 6 | 0.1 | 0.1 | 0.2 | 0 | 0.1 | La | 0.02 |
| Example | 18 | Remainder | 22 | 11 | 0 | 0.1 | 0.2 | 0 | 0.2 | Ce | 0.02 |
| Example | 19 | Remainder | 22 | 3 | 0.1 | 0.1 | 0 | 0 | 0.2 | Zr | 0.01 |
| Example | 20 | Remainder | 24 | 3 | 0.2 | 0.1 | 0 | 0 | 0.3 | W | 0.02 |
| Example | 21 | Remainder | 22 | 4 | 0.1 | 0.1 | 0 | 0.01 | 0.4 | Mo | 0.03 |
| Example | 22 | Remainder | 22 | 8 | 0 | 0.2 | 0.3 | 0 | 0.5 | Ti | 0.01 |
| Example | 23 | Remainder | 24 | 8 | 0 | 0.6 | 0.3 | 0 | 0.9 | Cu | 0.2 |
| Example | 24 | Remainder | 28 | 9 | 0.1 | 1.3 | 0.3 | 0 | 1.4 | Y | 0.02 |
| Example | 25 | Remainder | 30 | 10 | 0.1 | 2 | 0.3 | 0 | 1.3 | Cr | 0.05 |

TABLE 1-continued

| Classification | No. | Plated layer components (mass %) remainder: Zn and impurity Zn | Al | Mg | Sn | Si | Ca | Ni | Fe | Other elements Type | Total (%) |
|---|---|---|---|---|---|---|---|---|---|---|---|
| Comparative Example | 26 | Remainder | 6.5 | 3 | 0 | 0 | 0 | 0 | 0.1 | — | — |
| Comparative Example | 27 | Remainder | 32 | 6 | 0.0 | 0.1 | 0 | 0 | 0.1 | — | — |
| Comparative Example | 28 | Remainder | 19 | 2.3 | 0 | 0.2 | 0.2 | 0 | 0.1 | — | — |
| Comparative Example | 29 | Remainder | 19 | 16 | 0 | 0 | 0.2 | 0 | 0.1 | — | — |
| Comparative Example | 30 | Remainder | 19 | 5 | 0 | 10.5 | 0.2 | 0 | 0.1 | — | — |
| Comparative Example | 31 | Remainder | 19 | 5 | 2.3 | 0 | 0 | 0 | 0.1 | — | — |
| Comparative Example | 32 | Remainder | 20 | 5 | 0 | 0.2 | 4.2 | 0 | 0.1 | — | — |
| Comparative Example | 33 | Remainder | 19 | 5 | 0 | 0.2 | 0.3 | 0 | 0.5 | — | — |
| Comparative Example | 34 | Remainder | 20 | 5 | 0 | 0.6 | 0.3 | 0 | 0.8 | — | — |
| Comparative Example | 35 | Remainder | 19 | 5 | 0 | 0.1 | 0.3 | 0 | 0.5 | — | — |
| Comparative Example | 36 | Remainder | 19 | 5 | 0 | 0.2 | 0.3 | 0 | 0.5 | — | — |
| Comparative Example | 37 | Remainder | 19 | 4.5 | 0 | 0.2 | 0.2 | 0 | 0.5 | — | — |

Underlined portions indicate that it is outside the scope of the present invention.

TABLE 2

| Classification | No. | Production conditions Plating bath temperature (° C.) | temperature to start cooling (° C.) | Cooling gas flux (L/min/m$^2$) from after pulling-up from bath to 300° C. | Cooling rate (° C./s) from after pulling up steel sheet from bath to 300° C. |
|---|---|---|---|---|---|
| Example | 1 | 450 | 440 | 25000 | 20 |
| Example | 2 | 480 | 470 | 25000 | 20 |
| Example | 3 | 480 | 470 | 5000 | 14 |
| Example | 4 | 510 | 470 | 25000 | 20 |
| Example | 5 | 510 | 500 | 5000 | 14 |
| Example | 6 | 500 | 490 | 25000 | 20 |
| Example | 7 | 500 | 490 | 25000 | 20 |
| Example | 8 | 500 | 490 | 5000 | 14 |
| Example | 9 | 500 | 490 | 5000 | 14 |
| Example | 10 | 500 | 490 | 5000 | 14 |
| Example | 11 | 500 | 460 | 5000 | 14 |
| Example | 12 | 500 | 490 | 10000 | 17 |
| Example | 13 | 500 | 490 | 5000 | 14 |
| Example | 14 | 520 | 510 | 25000 | 20 |
| Example | 15 | 550 | 540 | 5000 | 14 |
| Example | 16 | 550 | 540 | 25000 | 20 |
| Example | 17 | 550 | 540 | 5000 | 14 |
| Example | 18 | 550 | 540 | 10000 | 16 |
| Example | 19 | 550 | 540 | 25000 | 20 |
| Example | 20 | 550 | 540 | 25000 | 20 |
| Example | 21 | 550 | 540 | 25000 | 20 |
| Example | 22 | 550 | 540 | 10000 | 17 |
| Example | 23 | 550 | 540 | 10000 | 17 |
| Example | 24 | 550 | 540 | 5000 | 14 |
| Example | 25 | 540 | 530 | 25000 | 20 |
| Comparative Example | 26 | 450 | 440 | 25000 | 20 |
| Comparative Example | 27 | 550 | 540 | 25000 | 20 |
| Comparative Example | 28 | 500 | 490 | 25000 | 20 |
| Comparative Example | 29 | 550 | 540 | 25000 | 20 |

TABLE 2-continued

| Classification | No. | Production conditions: Plating bath temperature (° C.) | temperature to start cooling (° C.) | Cooling gas flux (L/min/m²) from after pulling-up from bath to 300° C. | Cooling rate (° C./s) from after pulling up steel sheet from bath to 300° C. |
|---|---|---|---|---|---|
| Comparative Example | 30 | 500 | 490 | 25000 | 20 |
| Comparative Example | 31 | 500 | 490 | 25000 | 20 |
| Comparative Example | 32 | 500 | 490 | 25000 | 20 |
| Comparative Example | 33 | 500 | 490 | 2500 | 18 |
| Comparative Example | 34 | 520 | 510 | 27000 | 18 |
| Comparative Example | 35 | 500 | 490 | 2500 | 20 |
| Comparative Example | 36 | 500 | 490 | 4000 | 19 |
| Comparative Example | 37 | 500 | 450 | 7000 | 19 |

Underlined portions indicate that it is outside the scope of the present invention.

TABLE 3

| Classification | No. | Microstructure of plated layer: $MgZn_2$ phase I(002)/(I(100) + I(101)) | α phase I(111)/I(200) | $Mg_2Sn$ phase Presence or absence | Performance: Planar corrosion resistance | Corrosion resistance after coating |
|---|---|---|---|---|---|---|
| Example | 1 | 0.3 | 5.1 | Absent | A | A |
| Example | 2 | 0.4 | 7.5 | Present | A | AA |
| Example | 3 | 0.6 | 10.6 | Present | AAA | AAA |
| Example | 4 | 0.5 | 9.0 | Present | AA | AA |
| Example | 5 | 0.8 | 14.5 | Absent | AAA | AAA |
| Example | 6 | 0.9 | 6.5 | Absent | A | A |
| Example | 7 | 0.8 | 6.7 | Present | AA | AA |
| Example | 8 | 1.0 | 16.7 | Present | AAA | AAA |
| Example | 9 | 1.1 | 20.5 | Present | AA | AAA |
| Example | 10 | 1.4 | 22.5 | Present | AAA | AAA |
| Example | 11 | 1.2 | 22.6 | Present | AAA | AAA |
| Example | 12 | 1.5 | 27.5 | Present | AAA | AAA |
| Example | 13 | 1.6 | 26.5 | Present | AAA | AAA |
| Example | 14 | 0.4 | 9.6 | Absent | AA | AA |
| Example | 15 | 1.2 | 19.0 | Absent | AAA | AAA |
| Example | 16 | 0.5 | 8.4 | Absent | AA | AA |
| Example | 17 | 1.6 | 29.3 | Present | AAA | AAA |
| Example | 18 | 1.8 | 30.0 | Absent | AAA | AAA |
| Example | 19 | 0.4 | 8.9 | Present | AA | AA |
| Example | 20 | 0.5 | 8.6 | Present | AA | AA |
| Example | 21 | 0.5 | 5.8 | Present | AA | AA |
| Example | 22 | 2.4 | 30.8 | Absent | AAA | AAA |
| Example | 23 | 2.5 | 33.0 | Absent | AAA | AAA |
| Example | 24 | 3.0 | 40.0 | Present | AAA | AAA |
| Example | 25 | 0.4 | 8.3 | Present | AA | A |
| Comparative Example | 26 | 0.5 | 5.1 | Absent | B | A |
| Comparative Example | 27 | 0.4 | 5.5 | Absent | AA | B |
| Comparative Example | 28 | 0.5 | 5.6 | Absent | B | B |
| Comparative Example | 29 | 0.4 | 5.6 | Absent | B | A |
| Comparative Example | 30 | 0.5 | 5.9 | Absent | B | B |
| Comparative Example | 31 | 0.3 | 6.4 | Present | B | B |
| Comparative Example | 32 | 0.4 | 6.4 | Absent | B | B |

TABLE 3-continued

| | | Microstructure of plated layer | | | Performance | |
|---|---|---|---|---|---|---|
| Classification | No. | $MgZn_2$ phase I(002)/(I(100) + I(101)) | α phase I(111)/I(200) | $Mg_2Sn$ phase Presence or absence | Planar corrosion resistance | Corrosion resistance after coating |
| Comparative Example | 33 | 0.1 | 2.1 | Absent | B | B |
| Comparative Example | 34 | 0.1 | 1.1 | Absent | B | B |
| Comparative Example | 35 | 0.1 | 2.1 | Absent | B | B |
| Comparative Example | 36 | 0.1 | 2 | Absent | B | B |
| Comparative Example | 37 | 0.1 | 2.2 | Absent | B | B |

Underlined portions indicate that it is outside the scope of the present invention.

FIELD OF INDUSTRIAL APPLICATION

The above aspect of the present invention is excellent in both planar corrosion resistance and sacrificial corrosion resistance and high in industrial applicability.

What is claimed is:

1. A hot-dip plated steel material comprising:

a steel material; and a hot-dip plated layer disposed on a surface of the steel material, wherein the hot-dip plated layer has a chemical composition containing, in terms of mass %, Al: 10.0 to 20.0%, Mg: 3.0 to 15.0%, Fe: 0.01 to 15.0%, Si: 1.3 to 10.0%, Ni: 0 to 1.0%, and Ca: 0 to 4.0%, and further containing one or two or more elements selected from the element group consisting of Sb: 0 to 0.5%, Pb: 0 to 0.5%, Cu: 0 to 1.0%, Sn: 0 to 2.0%, Ti: 0 to 1.0%, Cr: 0 to 1.0%, Nb: 0 to 1.0%, Zr: 0 to 1.0%, Mn: 0 to 1.0%, Mo: 0 to 1.0%, Ag: 0 to 1.0%, Li: 0 to 1.0%, La: 0 to 0.5%, Ce: 0 to 0.5%, B: 0 to 0.5%, Y: 0 to 0.5%, P: 0 to 0.5%, Sr: 0 to 0.5%, Co: 0 to 0.5%, Bi: 0 to 0.5%, In: 0 to 0.5%, V: 0 to 0.5%, and W: 0 to 0.5%, in an amount of 5% or less in total, and the remainder: Zn and an impurity, and the hot-dip plated layer has a diffraction intensity obtained from a result of X-ray diffraction measurement, the diffraction intensity satisfying a relationship of the following formulas (1a) and (2a):

$$0.3 \leq I(002)_{MgZn2}/\{I(100)_{MgZn2}+I(101)_{MgZn2}\} \leq 3.0 \quad (1a)$$

$$3.0 < I(111)_{\alpha}/I(200)_{\alpha} \leq 40.0 \quad (2a)$$

wherein, in the formula (1a), $I(002)_{MgZn2}$ represents an $MgZn_2$ phase (002) diffraction intensity, $I(100)_{MgZn2}$ represents an $MgZn_2$ phase (100) diffraction intensity, and $I(101)_{MgZn2}$ represents an $MgZn_2$ phase (101) diffraction intensity, and in the formula (2a), $I(111)_{\alpha}$ represents an α phase (111) diffraction intensity and $I(200)_{\alpha}$ represents an α phase (200) diffraction intensity.

2. The hot-dip plated steel material according to claim 1, wherein the chemical composition of the hot-dip plated layer contains Sn: 0.05 to 0.5% in terms of mass %, and the hot-dip plated layer has a result of X-ray diffraction measurement that an $Mg_2Sn$ phase is detected.

3. The hot-dip plated steel material according to claim 1, wherein, in terms of mass %, the amount of Al is 15.0 to 20.0%, and the amount of Mg is 5.0 to 10.0% in the chemical composition of the hot-dip plated layer, and wherein the hot-dip plated layer has a diffraction intensity obtained from a result of X-ray diffraction measurement, the diffraction intensity satisfying a relationship of the following formulas (1b) and (2b):

$$0.6 < I(002)_{MgZn2}/\{I(100)_{MgZn2}+I(101)_{MgZn2}\} \leq 3.0 \quad (1b)$$

$$5.0 < I(111)_{\alpha}/I(200)_{\alpha} \leq 40.0 \quad (2b)$$

wherein, in the formula (1b), $I(002)_{MgZn2}$ represents an $MgZn_2$ phase (002) diffraction intensity, $I(100)_{MgZn2}$ represents an $MgZn_2$ phase (100) diffraction intensity, and $I(101)_{MgZn2}$ represents an $MgZn_2$ phase (101) diffraction intensity, and in the formula (2b), I(111) a represents an α phase (111) diffraction intensity and $I(200)_{\alpha}$ represents an α phase (200) diffraction intensity.

* * * * *